(12) United States Patent
Duan et al.

(10) Patent No.: US 8,724,303 B2
(45) Date of Patent: May 13, 2014

(54) PORTABLE ELECTRONIC DEVICE

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 40 days.

(21) Appl. No.: 13/336,016

(22) Filed: Dec. 23, 2011

(65) Prior Publication Data

US 2013/0107428 A1    May 2, 2013

(30) Foreign Application Priority Data

Nov. 1, 2011    (CN) .......................... 2011 2 0426051

(51) Int. Cl.
*H05K 7/00*    (2006.01)
*H04M 1/02*    (2006.01)

(52) U.S. Cl.
USPC ................. 361/679.16; 455/575.1; 455/550.1; 455/347; 361/679.14; 361/679.15; 361/679.56; 400/693

(58) Field of Classification Search
CPC ............. H05K 5/03; H05K 7/00; H04Q 7/20; H04Q 7/00; H04M 1/02
USPC .................. 361/679.21–679.3; 312/223.1; 455/575.1, 550.1, 347
See application file for complete search history.

(56) References Cited

U.S. PATENT DOCUMENTS

| | | | |
|---|---|---|---|
| 7,117,562 B2 * | 10/2006 | Zuo et al. | 16/303 |
| 7,130,669 B2 * | 10/2006 | Moon | 455/575.3 |
| D654,467 S * | 2/2012 | Duan et al. | D14/138 AB |
| 2006/0056141 A1 * | 3/2006 | Pihlaja et al. | 361/683 |
| 2009/0186663 A1 * | 7/2009 | Griffin et al. | 455/566 |

* cited by examiner

*Primary Examiner* — Zachary M Pape
*Assistant Examiner* — Douglas Burtner
(74) *Attorney, Agent, or Firm* — Novak Druce Connolly Bove + Quigg LLP

(57) ABSTRACT

A portable electronic device includes a main body, a first cover and a second cover. The main body includes a display formed on a surface thereof. The first cover is rotatably connected to one end of the main body and the second cover is rotatably connected to another end of the main body. When the first cover and the second cover are in a closed state, the first cover and the second cover are positioned at an opposite surface of the display. When the first cover and the second cover are unfolded like wings to be in an open state, the first cover and the second cover are positioned to extend from opposite sides of the display.

8 Claims, 5 Drawing Sheets

PORTABLE ELECTRONIC DEVICE

BACKGROUND

1. Technical Field

The present disclosure generally relates to portable electronic devices, particularly, to a portable electronic device having dual keypads.

2. Description of Related Art

Portable electronic devices, such as mobile telephones and personal digital assistants (PDAs), are widespread. Such portable electronic devices enable consumers to enjoy the services of high technology anywhere, anytime.

Many portable electronic devices have only a touch screen, and not a physical keypad. A virtual keypad replaces the physical keypad. A user may need to switch between a variety of keypad modes, and additionally, when the users need to frequently operate the virtual keypad, the virtual keypad will occupy the space of the touch screen and obscure or reduce the display area of any desired application. Operating the device in this way is not the optimum arrangement.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views.

DETAILED DESCRIPTION

Figure 1:
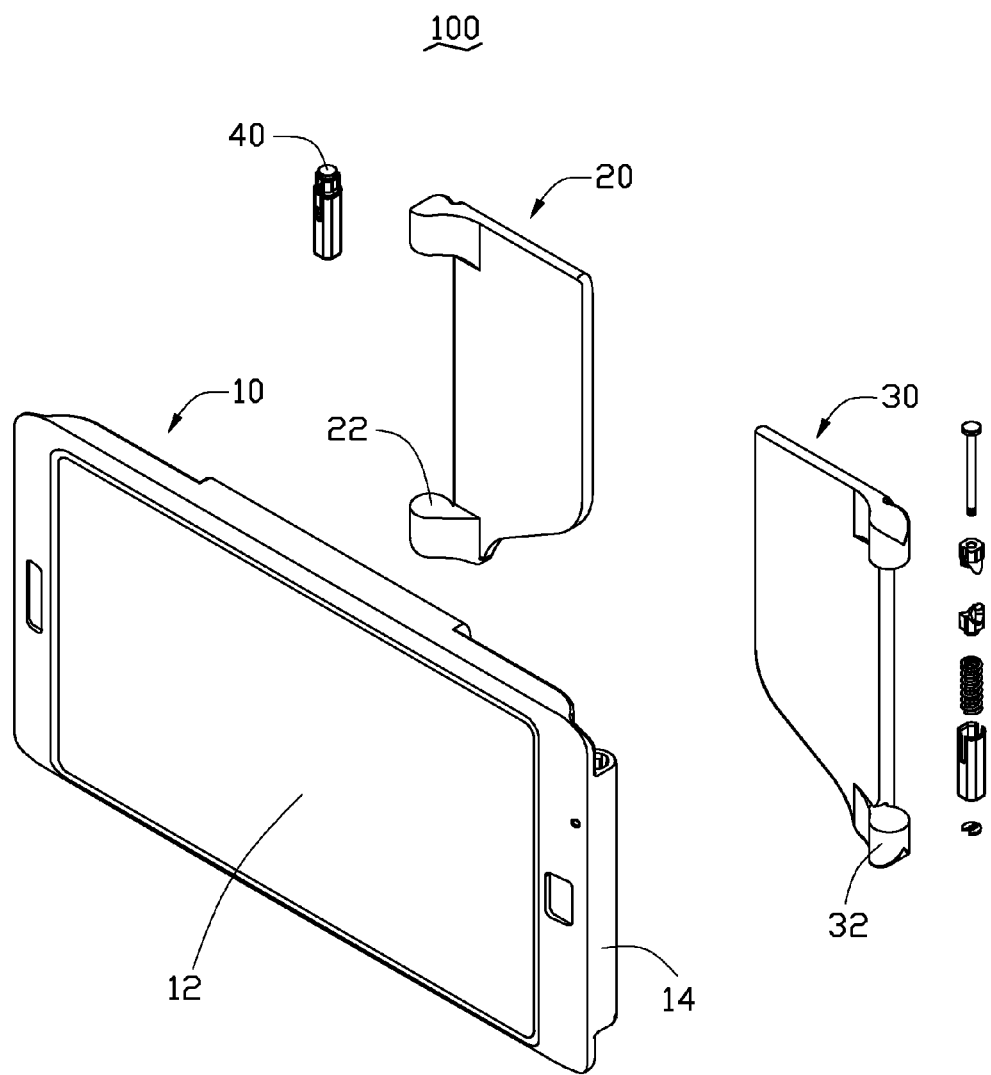
FIG. 1 is an exploded, isometric view of a portable electronic device with dual keypads in accordance with an exemplary embodiment.
Figure 2:
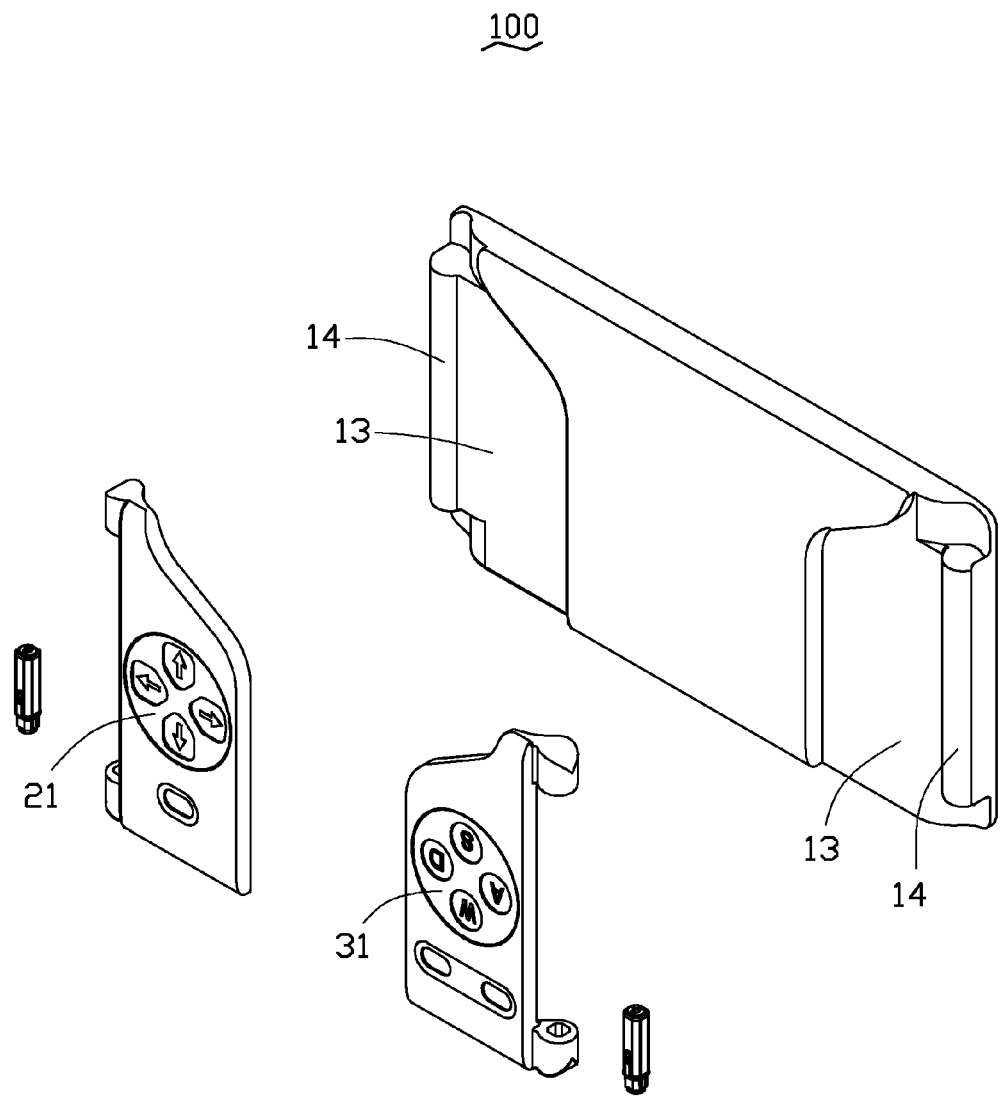
FIG. 2 is similar to FIG. 1, but shown from another aspect.

The disclosed portable electronic device, shown in the exemplary embodiment as a mobile phone, can alternatively be a personal digital assistant (PDA), or other device within the scope of the disclosure.

The main body 10 is substantially rectangular, and includes two long side edges and two short side edges. In this exemplary embodiment, the first cover 20 and the second cover 30 are each connected to a short side edge of the main body 10 to allow the first cover 20 and the second cover 30 to fully utilize the space along the long side edge direction. The main body 10 includes a display 12 formed on a surface thereof. For example, the display 12 is positioned on a top surface of the main body 10 when the mobile phone is held in the user's hands or laid on a table and used. Two recesses 13 are respectively defined in the opposing or bottom surface of the main body 10. Each recess 13 begins at an edge of the main body 10 and extends towards the other recess 13 and towards the center of the opposing or bottom surface of the main body 10. In this exemplary embodiment, the opposing surface is a back surface of the mobile phone. A depth of each recess 13 is substantially equals to the thickness of their respective first cover 20 and the second cover 30. When the first cover 20 and the second cover 30 are received in the recesses 13 so as to be in a closed state, the first cover 20 and the second cover 30 are substantially coplanar with the back surface of the main body 10. In another embodiment, a depth of the recesses 13 is slightly larger than the thickness of the first cover 20 and the second cover 30. When the first cover 20 and the second cover 30 are received in the recesses 13 in a closed state, and the first cover 20 and the second cover 30 lay slightly below the back surface of the main body 10. This structure allows the back surface to directly contact a supporting surface such as a table and prevents scratches and abrasions on the first cover 20 and the second cover 30.

The first cover 20 has a first keypad 21, and the second cover 30 has a second keypad 31. The keypads 21, 31 on the first cover 20 and the second cover 30, may be rotated out to extend from each side of the display 12 from the recesses 12 and operated in that position, or may be operated whilst in the recesses 12.

The first cover 20 and the second cover 30 are rotatably connected to the main body 10 with two hinge assembles 40. In this exemplary embodiment, each short side edge of the main body 10 includes a hinge barrel 14. Connecting portions 22 to correspond to the hinge barrel 14 are formed on one end of the first cover 20. One hinge assembly 40 is connected between one hinge barrel 14 and the connecting portions 22 of the first cover 20. Similar connecting portions 32 are formed on one end of the second cover 30. The other hinge assembly 40 is connected between the other hinge barrel 14 and the connecting portions 32 of the second cover 30.

Figure 3:
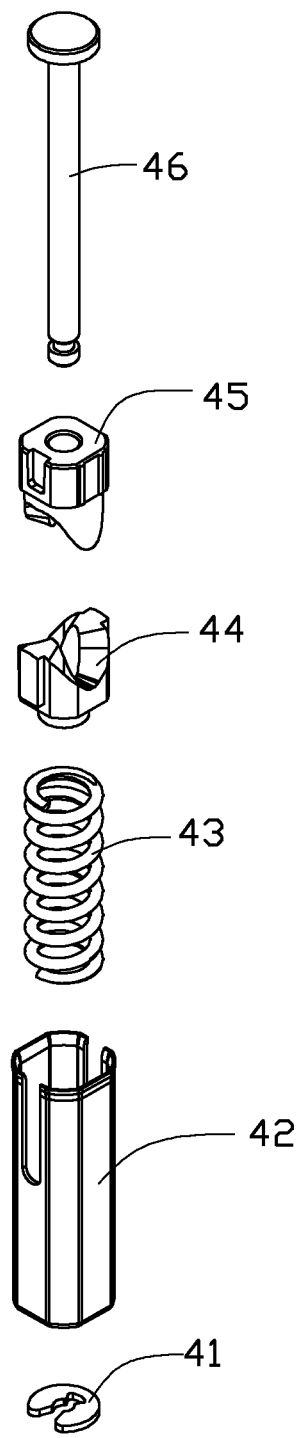
FIG. 3 is an exploded, isometric view of a hinge assembly used in the portable electronic device.

Referring to FIG. 3, each hinge assembly 40 includes a washer 41, a sleeve 42, an elastic member 43, a cam 44, a follower 45 and a shaft 46. The cam 44, the follower 45 and the elastic member 43 are placed around the shaft 46, and are received in the sleeve 42.

Figure 4:
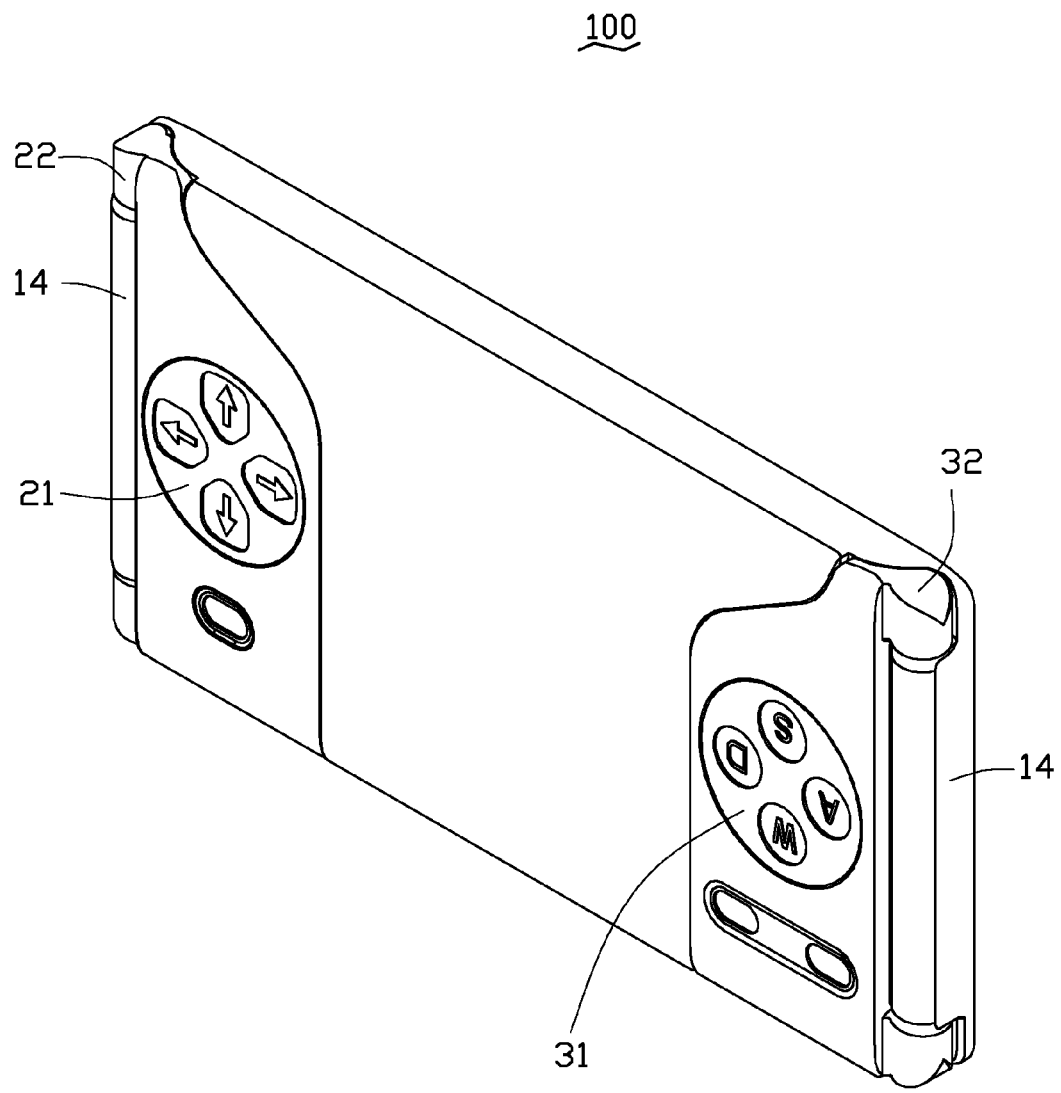
FIG. 4 is a schematic view of the portable electronic device showing the dual keypads in a folded state.
Figure 5:
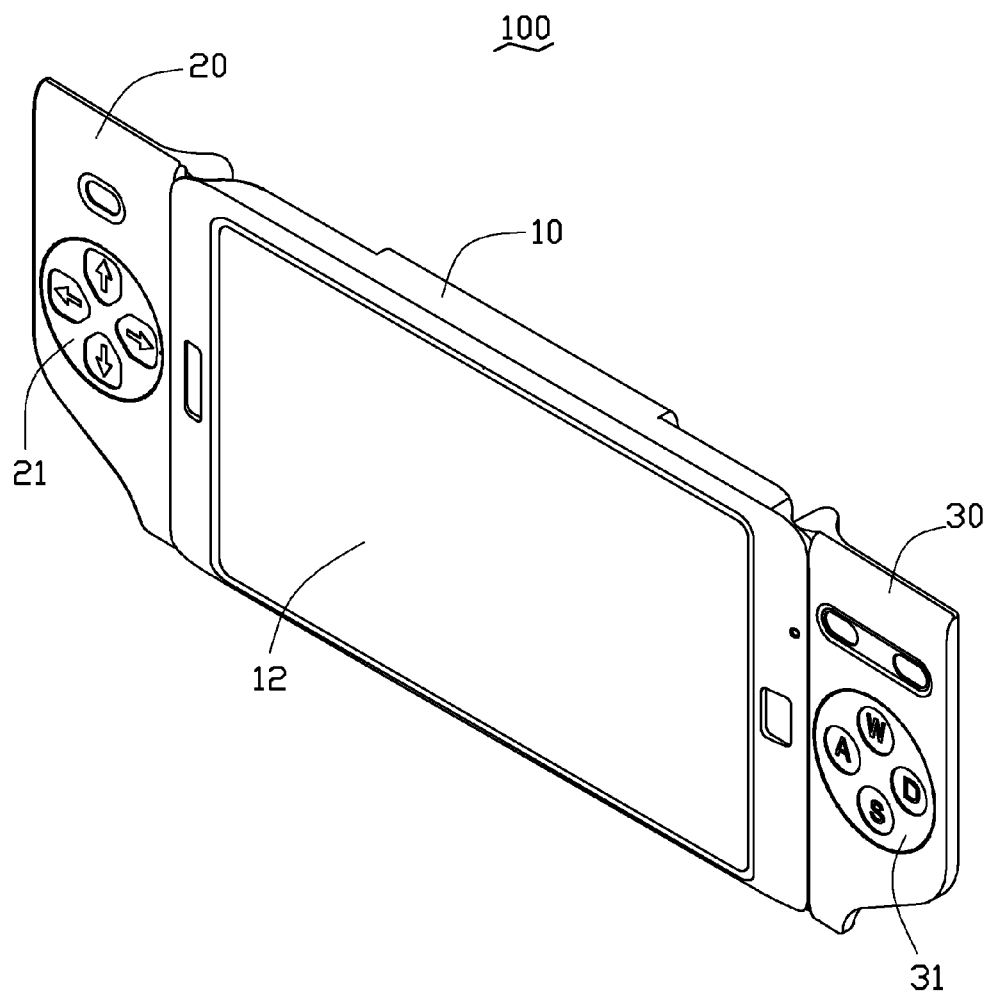
FIG. 5 is a schematic view of the portable electronic device showing the dual keypads unfolded.

Referring to FIGS. 4 and 5, when the user only needs to operate the display 12, the first, second covers 20, 30 may remain in place in the recesses 13. When the user needs to operate the keypads 21, 31, the first cover 20 or/and the second cover 30 can be rotated to the two sides of the display 12 and each of the keypads 21,31 is operable in that position. The two covers 20, 30 will not increase the thickness of the portable electronic device.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device, comprising:
   a main body, the main body having first and second opposite surfaces and first and second edges; a display formed in the first surface thereof and two spaced recesses respectively defined in the second surface, each recess beginning at an edge of the main body and extends towards the other recess and towards the center of the of second surface of the main body;
   a first cover rotatably connected to the first edge of the main body, wherein the first cover rotates about an axis substantially parallel with the first edge;
   a second cover rotatably connected to the second edge of the main body, wherein the second cover rotates about an axis substantially parallel with the second edge;
   wherein when the first cover and the second cover are in their closed state, the first cover and the second cover are received in the recesses and have planar surfaces exposed from the main body, and the first cover and the second cover are substantially coplanar with non-recessed portions of the second surface of the main body; wherein when the first cover and the second are in their open state, the first cover and the second cover are respectively rotated along the axes substantially parallel with the first and second edges and in opposite directions from the display, and the first surface, the first cover, and the second cover are all substantially coplanar.

2. The portable electronic device as claimed in claim 1, wherein the main body is substantially rectangular, and includes two long side edges and two short side edges, the first cover and the second cover are connected to the respective short side edges of the main body.

3. The holder as claimed in claim 1, wherein the first surface is a top surface, the second surface is a bottom surface, the display is positioned on the top surface of the main body.

4. The holder as claimed in claim 3, wherein a depth of the recesses is substantially equals to a thickness of the first cover and the second cover, when the first cover and the second cover are respectively received in the recesses in a close state, and the first cover and the second cover are substantially coplanar with the back surface of the main body.

5. The holder as claimed in claim 3, wherein a depth of the recesses is slightly larger than a thickness of the first cover and the second cover, when the first cover and the second cover are respectively received in the recesses in a closed state, and the first cover and the second cover are lay below the back surface of the main body.

6. The holder as claimed in claim 1, wherein each of the first cover and the second cover is rotatably connected to the main body by a hinge assembly.

7. The holder as claimed in claim 6, wherein each end of the main body includes a hinge barrel, two pairs of opposite connecting portions are formed on one end of the first cover and the second cover, one of the hinge assemblies is connected between one hinge barrel and the connecting portions of the first cover, the other hinge assembly is connected between the other hinge barrel and the connecting portions of the second cover.

8. The holder as claimed in claim 7, wherein each hinge assembly includes a washer, a sleeve, an elastic member, a cam, a follower and a shaft, the cam, the follower and the elastic member are placed around the shaft, and are received in the sleeve.

* * * * *